United States Patent [19]
Wood

[11] Patent Number: 5,765,844
[45] Date of Patent: Jun. 16, 1998

[54] LINKAGE ASSEMBLY

[75] Inventor: Ruey E. Wood, Harrison, Mich.

[73] Assignee: TRW Inc., Lyndhurst, Ohio

[21] Appl. No.: 553,844

[22] Filed: Nov. 6, 1995

[51] Int. Cl.[6] ..................................................... B62D 3/12
[52] U.S. Cl. ........................ 280/95.1; 280/771; 280/846
[58] Field of Search ........................... 280/771, 95.1, 280/96, 846

[56] References Cited

U.S. PATENT DOCUMENTS

| | | | |
|---|---|---|---|
| 1,315,126 | 9/1919 | Hornick | 280/95.1 |
| 1,418,044 | 5/1922 | Williams . | |
| 1,462,467 | 7/1923 | White . | |
| 1,726,971 | 9/1929 | Yarian | 280/95.1 |
| 1,817,529 | 8/1931 | Skillman . | |
| 1,824,450 | 9/1931 | Sneed . | |
| 1,828,707 | 10/1931 | Sanders | 280/95.1 |
| 1,898,100 | 2/1933 | Skillman . | |
| 1,905,496 | 4/1933 | Peo . | |
| 1,977,450 | 10/1934 | Mitchell . | |
| 2,215,243 | 9/1940 | Klages . | |
| 2,274,420 | 2/1942 | Katcher | 280/95.1 |
| 2,305,880 | 12/1942 | Leighton . | |
| 2,305,881 | 12/1942 | Leighton . | |
| 2,488,979 | 11/1949 | Kogstrom | 280/95.1 |
| 2,771,300 | 11/1956 | Latzen | 280/95.1 |
| 4,887,486 | 12/1989 | Wood, Jr. . | |
| 5,066,160 | 11/1991 | Wood . | |
| 5,165,306 | 11/1992 | Hellon . | |
| 5,286,131 | 2/1994 | Wood . | |

FOREIGN PATENT DOCUMENTS

| | | | |
|---|---|---|---|
| 602081 | 5/1948 | United Kingdom | 280/95.1 |

*Primary Examiner*—Eric D. Culbreth
*Attorney, Agent, or Firm*—Tarolli, Sundheim, Covell, Tummino & Szabo

[57] ABSTRACT

A linkage assembly (20) for use in turning steerable vehicle wheels includes a hollow center link (30) formed of a single piece of sheet metal. A first hollow tie rod (54) is pivotally connected with a first connector section (48) of the center link (30) and with a steerable vehicle wheel (22). The first tie rod (54) includes a hollow inner section (62) formed of a single piece of sheet metal and a hollow outer section (64) formed of a single piece of sheet metal. An adjustment mechanism (66) interconnects the inner and outer sections (62, 64) of the first tie rod (54) to enable the length of the first tie rod to be varied. A second hollow tie rod (74) has the same construction as the first tie rod (54) and is connected with a second connector section (50) of the center link (30) and with a second steerable vehicle wheel (24).

8 Claims, 9 Drawing Sheets

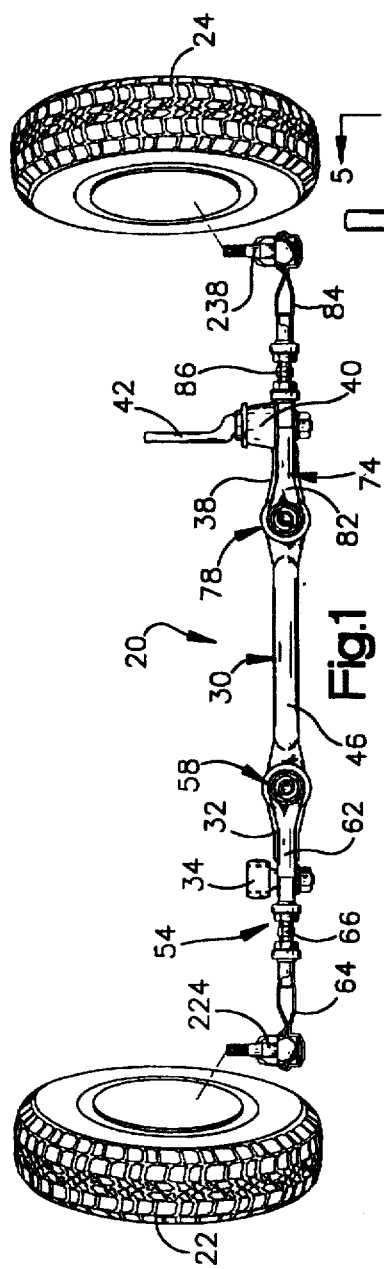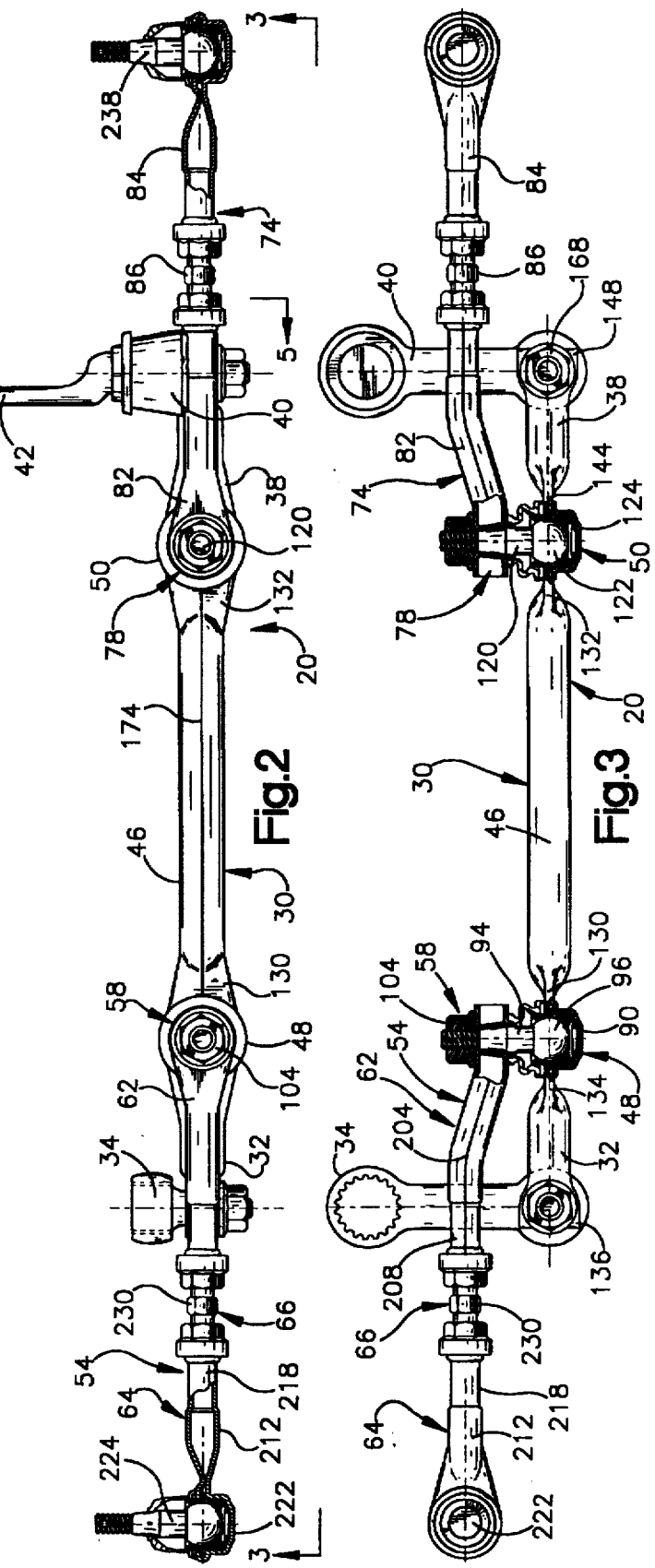

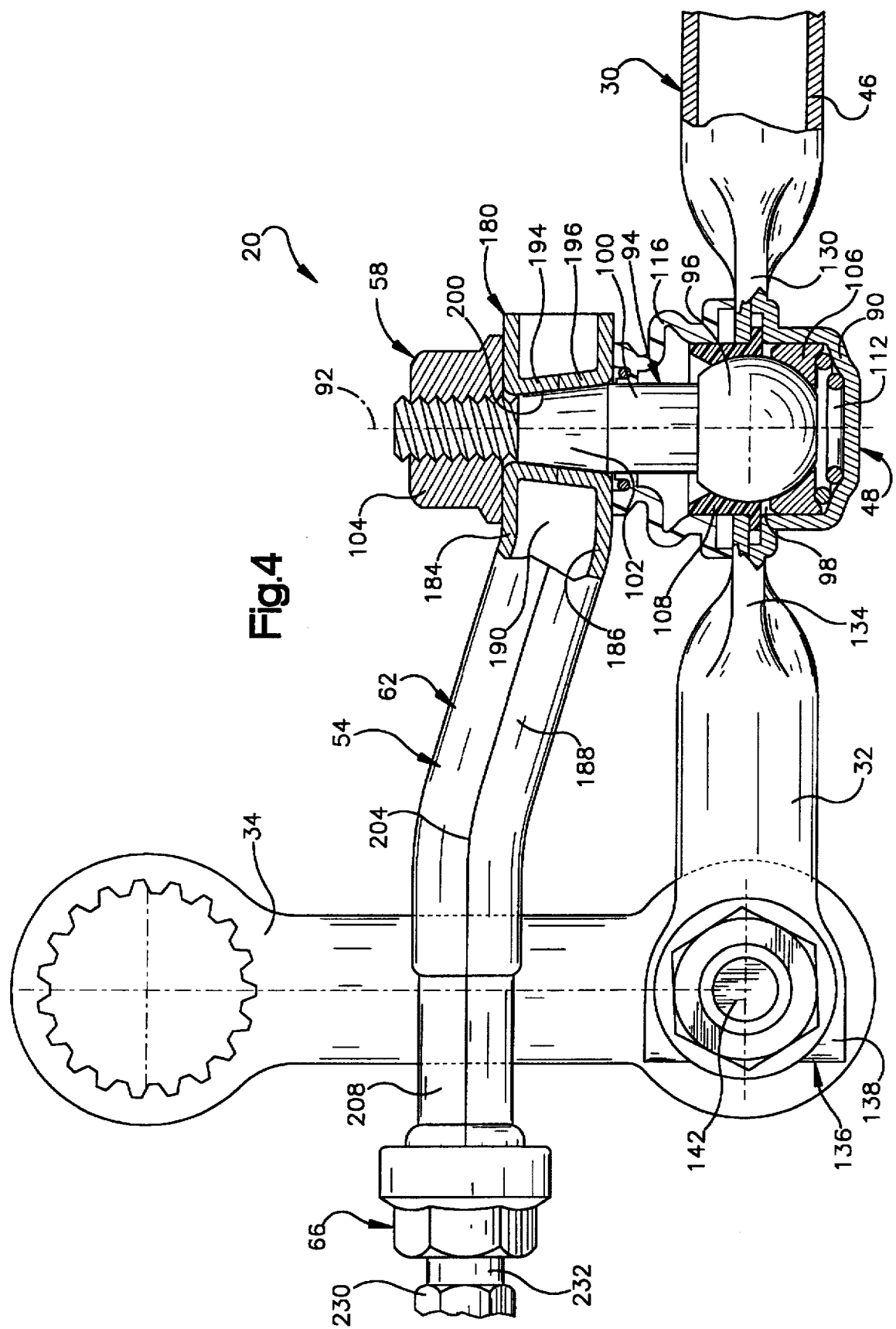

LINKAGE ASSEMBLY

BACKGROUND OF THE INVENTION

The present invention relates to a new and improved linkage assembly for use in turning steerable vehicle wheels.

Steering linkages are typically manufactured from forgings and are heavy in weight. These steering linkages may have a construction similar to the construction disclosed in U.S. Pat. Nos. 3,028,172 and 3,525,533. The heavy forged components of the steering linkage are expensive to manufacture and contribute to the weight of a vehicle.

It has been suggested that a steering linkage could include a hollow center link formed from a plurality of pieces of sheet metal. However, relatively heavy forged tie rods are used with this hollow center link. A steering linkage having a hollow center link and heavy forged tie rods is illustrated in U.S. Pat. Nos. 2,305,880 and 2,305,881.

SUMMARY OF THE INVENTION

The present invention relates to a new and improved linkage assembly for use in turning steerable vehicle wheels. The linkage assembly includes a hollow center link formed from a single piece of sheet metal. A first hollow tie rod connects the center link with a steerable vehicle wheel. The first tie rod has a hollow inner section formed of a single piece of sheet metal and connected with the center link. The first tie rod also includes a hollow outer section formed of a single piece of sheet metal and connected with the steerable vehicle wheel. A first adjustment mechanism interconnects the inner and outer sections of the first tie rod to enable the length of the tie rod to be varied. A second hollow tie rod connects the center link with a second steerable vehicle wheel and has the same construction as the first tie rod.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic elevational view looking toward the front of a vehicle and depicting the relationship between a linkage assembly constructed in accordance with the present invention and steerable vehicle wheels;

FIG. 2 is an enlarged elevational view of the linkage assembly of FIG. 1;

FIG. 3 is a plan view, taken generally along the line 3—3 of FIG. 2, further illustrating the construction of the linkage assembly;

FIG. 4 is an enlarged fragmentary sectional view of a portion of the steering linkage of FIG. 3 and illustrating the manner in which a hollow inner section of a tie rod is pivotally connected with a hollow center link;

DESCRIPTION OF PREFERRED EMBODIMENTS OF THE INVENTION

General Description

Figure 5:
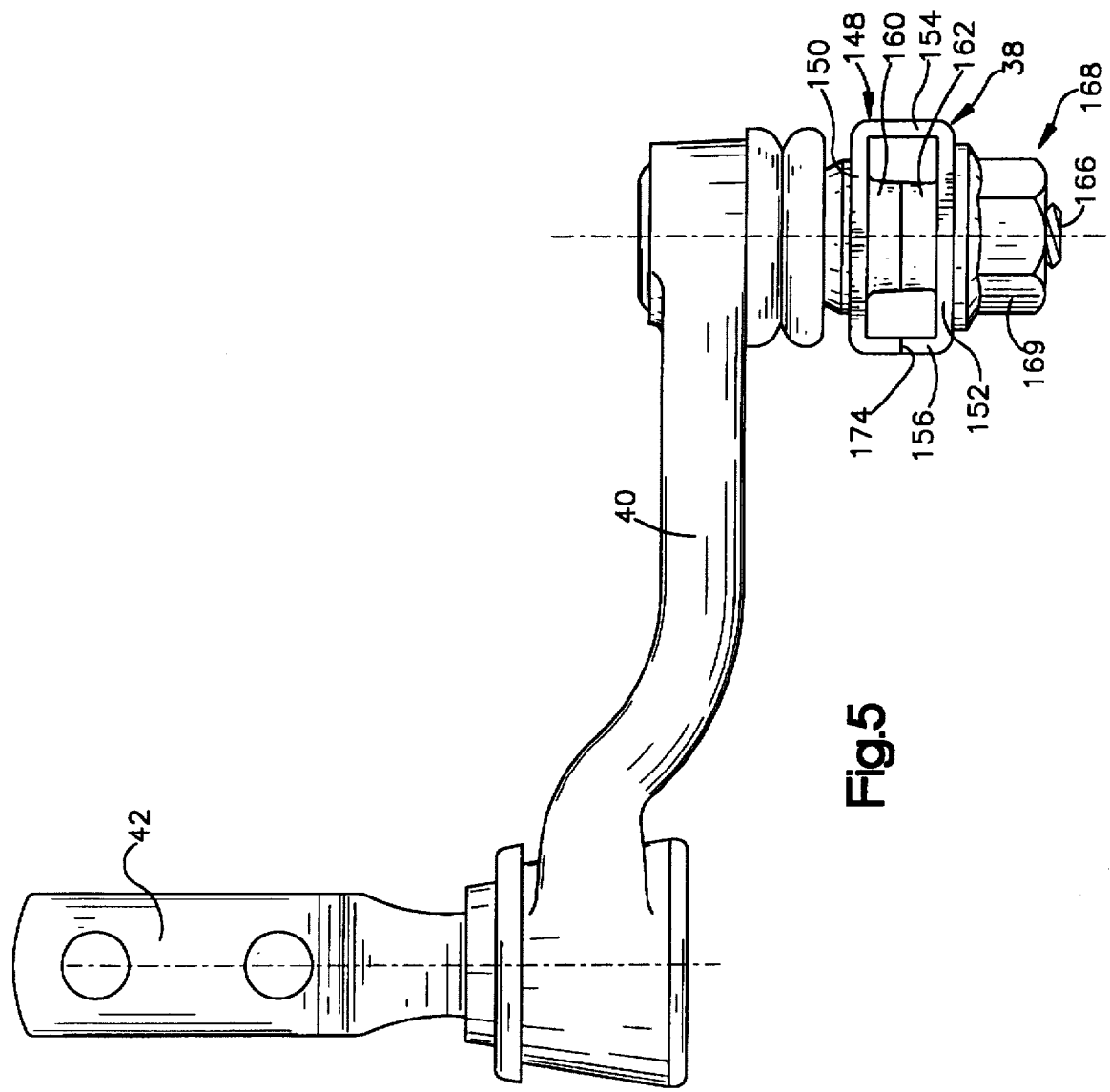
FIG. 5 is an enlarged elevational view, taken generally along the line 5—5 of FIG. 2, illustrating the manner in which the hollow center link is connected with an idler arm.

A linkage assembly 20 (FIG. 1), constructed in accordance with the present invention, is used to turn steerable vehicle wheels 22 and 24. In accordance with one of the features of the present invention, the linkage assembly 20 has hollow components which are light weight. Each of the hollow components of the linkage assembly 20 is stamped from a single piece of sheet metal and is inexpensive to fabricate.

The linkage assembly 20 includes a hollow center link 30 (FIGS. 1-3) which is formed of a single piece of sheet metal. A first hollow cylindrical end portion 32 (FIG. 3) of the center link 30 is connected with a forged pitman arm 34. The pitman arm 34 has a known construction and is connected with a known vehicle steering gear. The vehicle steering gear may be either manually actuated or power assisted.

A second hollow cylindrical end portion 38 of the center link 30 is connected with a forged idler arm 40. The idler arm 40 is pivotally connected with a frame of the vehicle by a mounting bracket 42 (FIG. 2).

The center link 30 has a hollow cylindrical central portion 46 (FIG. 3) disposed between and coaxial with the hollow end portions 32 and 38. The central portion 46 of the center link 30 is connected with the first hollow end portion 32 by a connector portion 48. The central portion 46 of the center link 30 is connected with the second hollow end portion 38 by a second connector portion 50. The first and second hollow end portions 32 and 38, central portion 46 and first and second connector portions 48 and 50 of the center link 30 are formed of a single piece of sheet metal.

A first hollow tie rod 54 (FIGS. 1-3) is formed of sheet metal. The first tie rod 54 is connected with the center link 30 at a first pivot joint connection 58 (FIG. 3). The first pivot joint connection 58 is partially formed by the first connector portion 48 of the center link 30.

The first tie rod 54 includes a hollow inner section 62 which is connected with the first pivot joint connection 58. The hollow inner section 62 is formed of a single piece of sheet metal. In addition, the first tie rod 54 includes a hollow outer section 64 (FIGS. 2 and 3) which is formed of a single piece of sheet metal. The hollow outer section 64 of the first tie rod 54 is connected with the steerable vehicle wheel 22 (FIG. 1) in a known manner.

An adjustment mechanism 66 (FIGS. 2 and 3) interconnects the inner section 62 and outer section 64 of the first tie rod 54. The adjustment mechanism 66 is operable to vary the length of the first tie rod 54. To accomplish this, the adjustment mechanism 66 is operable to vary the distance between the inner section 62 and the outer section 64 of the first tie rod 54.

A second hollow tie rod 74 is formed of sheet metal. The second tie rod 74 is connected with the center link 30 at a second pivot joint connection 78 (FIG. 3). The second pivot joint connection 78 is partially formed by the second connector portion 50 of the center link 30.

The second tie rod 74 includes a hollow inner section 82 which is connected with the second pivot joint connection 78. The hollow inner section 82 is formed of a single piece of sheet metal. The second tie rod 74 also includes a hollow outer section 84 which is formed of a single piece of sheet metal. The hollow outer section 84 of the second tie rod 74 is connected with the steerable vehicle wheel 24 (FIG. 1).

An adjustment mechanism 86 (FIGS. 2 and 3) interconnects the inner section 82 and outer section 84 of the second tie rod 74. The adjustment mechanism 86 is operable to vary the length of the second tie rod 74. To accomplish this, the adjustment mechanism 86 is operable to vary the distance between the inner section 82 and outer section 84 of the second tie rod 74.

Upon manual rotation of a vehicle steering wheel (not shown), a steering gear is actuated to move the pitman arm 34 in a known manner. Movement of the pitman arm 34 results in movement of the center link 30. The movement of the center link 30 has an axial component which is transmitted to the steerable vehicle wheels 22 and 24 by the first tie rod 54 and second tie rod 74. Since the center link 30, first tie rod 54 and second tie rod 74 are hollow, the weight of the linkage assembly 20 is minimized to thereby minimize the overall weight of the vehicle. In addition, the stamped sheet metal components of the center link 30, first tie rod 54 and second tie rod 74 are relatively inexpensive to manufacture.

Pivot Joint Connections

The first pivot joint connection 58 (FIG. 4) interconnects the center link 30 and the first tie rod 54. In the embodiment of the invention illustrated in FIG. 4, the first pivot joint connection 58 is a ball and socket type joint. The ball and socket type pivot joint connection 58 includes a metal housing 90 formed by the sheet metal connector portion 48 of the center link 30. The housing 90 has a generally cylindrical configuration. The housing 90 has a central axis which is coincident with a central axis 92 of the first pivot joint connection 58.

The first pivot joint connection 58 (FIG. 4) includes a pivot pin 94. Since the first pivot joint connection 58 has a ball and socket type construction, the pivot pin 94 is a ball stud which is capable of universal movement from the initial orientation shown in FIG. 4. The pivot pin 94 has a generally spherical ball end portion 96 disposed in a socket chamber 98 in the housing 90.

A shank portion 100 extends axially outward from the ball end portion 96 and is integrally formed as one piece with the ball end portion. The shank portion 100 has an axially tapering outer side surface 102. The outer side surface 102 forms a portion of a right circular cone having a central axis which is coincident with the central axis 92 of the pivot joint connection 58 when the pivot pin 94 is in the initial orientation shown in FIG. 4. A nut 104 engages an external thread convolution on an outer end portion of the shank portion 100.

The ball and socket type pivot joint connection 58 includes an annular inner bearing seat 106. The inner bearing seat 106 is formed of a suitable polymeric material and is engaged by the ball end portion 96 of the pivot pin 94. The inner bearing seat 106 is enclosed by and is disposed in engagement with an inner side surface of the housing 90.

An outer bearing seat 108 is formed of a suitable polymeric material. The outer bearing seat 108 is gripped by the housing 90 and is engaged by the ball end portion 96 of the pivot pin 94. The outer bearing seat 108 prevents pull-out of the ball end portion 96 of the pivot pin 94 from the socket chamber 98.

A metal coil spring 112 presses the inner bearing seat 106 against the ball end portion 96 of the pivot pin 94. This presses the ball end portion 96 of the pivot pin 94 against the outer bearing seat 108. The inner and outer bearing seats 106 and 108 have central axes which are coincident with the central axis 92 of the pivot joint connection 58.

A flexible elastomeric boot seal 116 grips the housing 90 and the shank portion 100 of the pivot pin 94. The boot seal 116 prevents contaminants from entering the pivot joint connection 58.

Although it is contemplated that the pivot joint connection 58 may have many different constructions, in the illustrated embodiment of the invention, the pivot joint connection 58 is a ball and socket type joint. The ball and socket type joint forming the pivot connection 58 has the same construction as is disclosed in U.S. Pat. No. 5,066,160 issued Nov. 19, 1991 and entitled "Ball Joint" and in U.S. Pat. No. 5,286,131 issued Feb. 15, 1994 and entitled "Ball Joint and Method of Assembly". Although it is preferred to form the first pivot joint connection 58 as a ball and socket type joint having the construction disclosed in the aforementioned U.S. Pat. Nos. 5,066,160 and 5,286,131, it should be understood that the first pivot joint connection 58 could have a different construction if desired.

The second pivot joint connection 78 (FIG. 3) has the same construction as the first pivot joint connection 58. Thus, the second pivot joint connection 78 is a ball and socket type joint and includes a pivot pin 120 having the same construction as the pivot pin 94 in the first pivot joint connection 58. A ball end portion 122 of the pivot pin 120 is enclosed by a housing 124 formed by the sheet metal of the second connector portion 50. The housing 124 has the same construction as the housing 90.

Center Link

In accordance with one of the features of the invention, the center link 30 is hollow and is formed from a single piece of sheet metal. Thus, a single piece of sheet metal is stamped or otherwise deformed to form the first hollow end portion 32 (FIG. 3), first connector portion 48, hollow central portion 46, second connector portion 50, and second hollow end portion 38 of the center link 30. Since the center link 30 is hollow, it is light weight. Since the center link 30 is stamped from a single piece of sheet metal, it can be inexpensively manufactured using a series of automated stamping operations.

A single elongated piece of sheet metal for the center link 30 is stamped to form the first and second connector portions 48 and 50 (FIG. 3). Each of the connector portions 48 and 50 has a generally cylindrical configuration. The connector portions 48 and 50 have parallel central axes which extend through and perpendicular to the central axis of the center link 30. The generally cylindrical configuration of the first and second connector portions 48 and 50 enable the connector portions to be used as the housings 90 and 124 of the first and second pivot joint connections 58 and 78.

The hollow central portion 46 of the center link 50 has a cylindrical configuration. Opposite ends of the central portion 46 are flattened or pressed together to facilitate forming the housings 90 and 124. Thus, the left (as viewed in FIG. 3) end portion of the central portion 46 of the center link 30 is flattened or pressed together at 130 (FIG. 4) to facilitate formation of the first housing 90. Similarly, the right (as viewed in FIG. 3) end portion of the central portion 46 of the center link 30 is flattened or pressed together at 132 to facilitate formation of the second housing 124.

The hollow first end portion 32 (FIGS. 3 and 4) of the center link 30 has a cylindrical central portion and is flattened at opposite ends. The right (as viewed in FIG. 4) end 134 of the first end portion 32 of the center link 30 is flattened to facilitate formation of the first connector portion 48. The left (as viewed in FIG. 4) end 136 of the first hollow end portion 32 is partially flattened in order to have a rectangular box-like cross sectional configuration. Thus, the left end 136 of the first hollow end portion 32 has a flat side surface 138 (FIG. 4) and an opposite flat side surface which extends parallel to the flat side surface 138. The flat side surfaces are separated by cylindrical reinforcing flanges (not shown) which extend inward from circular openings in the side surfaces.

A bolt 142 (FIG. 4) extends through the circular openings (not shown) in the left end 136 of the first hollow end portion 32 of the center link 30. The bolt 142 pivotally connects the center link 30 with the pitman arm 34. Of course, a pivot joint connection having a different construction could be utilized to interconnect the pitman arm 34 and the first hollow end portion 32 of the center link 30 if desired.

The hollow second end portion 38 (FIG. 3) of the center link 30 has the same construction as the first hollow end portion 32 of the center link. The second hollow end portion 38 of the center link 30 has a central portion which is formed as a cylinder. The left (as viewed in FIG. 3) end of the second hollow end portion 32 is flattened or pressed together at 144 to facilitate formation of the second housing 124. The right (as viewed in FIG. 3) end 148 of the second hollow end portion 38 is only partially flattened so as to have a rectangular box-like cross sectional configuration (FIG. 5).

The right end 148 of the second hollow end portion 38 has a flat upper (as viewed in FIG. 5) wall 150 and a flat lower wall 152. The upper and lower walls 150 and 152 extend parallel to each other and are interconnected by parallel side walls 154 and 156. A cylindrical reinforcing flange 160 (FIG. 5) extends downward from the upper wall 150 and engages a cylindrical reinforcing flange 162 extending upward from the lower wall 152. The reinforcing flanges 160 and 162 are disposed in abutting engagement with each other to maintain the upper wall 150 in a parallel relationship with the lower wall 152.

A pivot pin 166 of a pivot joint connection 168 extends through the annular reinforcing projections 160 and 162. A nut 169 on the pivot pin 166 engages the lower wall 152. The pivot pin 166 and nut 168 connect the right end 148 of the second hollow end portion 38 of the center link 30 with the idler arm 40. Although only the construction of the right end 148 of the second hollow end portion 38 of the center link 30 is shown in FIG. 5, it should be understood that the left end 136 (FIG. 3) of the first hollow end portion 32 of the center link 30 has the same construction as the right end 148 of the second hollow end portion 38.

The first and second end sections 32 and 38 and central portion 46 (FIG. 3) of the center link 30 have cylindrical outer side surfaces of the same diameter. The first and second end sections 32 and 38 and central portion 46 of the center link 30 are disposed in a coaxial relationship. The center link 30 has a single axially extending seam 174 (FIGS. 2 and 5) which extends between opposite ends of the center link 30. The seam 174 is formed where opposite end surfaces of the single piece of sheet metal forming the center link 30 are disposed in abutting engagement.

The first and second end portions 32 and 38 (FIG. 3) and the central portion 46 of the center link 30 have coincident longitudinal central axes. The housings 90 and 124 at the first and second connector portions 48 and 50 of the center link 30 have parallel central axes which extend perpendicular to and through the coincident central axes of the first and second end portions 32 and 38 and central portion 46 of the center link.

Tie Rods

The first tie rod 54 (FIGS. 3 and 4) has a hollow inner section 62 formed of a single piece of sheet metal and connected with the first pivot joint connection 58. The hollow inner section 62 includes an inner end portion 180 (FIG. 4) which encloses the shank portion 100 of the pivot pin 94. The end portion 180 of the inner section 62 of the first tie rod 54 has an upper side wall 184 and a lower side wall 186. Parallel connector walls 188 and 190 extend between the upper and lower side walls 184 and 186 and are integrally formed as one piece with the upper and lower side walls.

A cylindrical reinforcing flange 194 (FIG. 4) extends downward from the upper side wall 184. A cylindrical reinforcing flange 196 extends upward from the lower side wall 186. The flanges 194 and 196 are disposed in abutting engagement with each other to support the upper side wall 84 and lower side wall 186. The nut 104 presses the reinforcing flanges 194 and 196 together.

The reinforcing flanges 194 and 196 cooperate to form an axially tapering socket 200 in which the shank portion 100 of the pivot pin 94 is telescopically received. The socket 200 has a central axis which is coincident with the central axis 92 of the first pivot joint connection 58 when the pivot pin 94 is in the initial orientation of FIG. 4. The axially tapering outer side surface 102 on the shank portion 100 of the pivot pin 94 engages the inner side surface of the axially tapering socket 200 to interconnect the inner section 62 of the first tie rod 54 and the pivot pin 94.

The inner section 62 (FIG. 4) of the tie rod 54 has a generally rectangular box-like cross sectional configuration. The inner section 62 of the first tie rod 54 has a single seam or joint 204 which extends between opposite ends of the inner section 62. Seam 204 is formed where the edges of the single piece of sheet metal forming the inner section 62 are disposed in abutting engagement.

The inner section 62 has a cylindrical end portion 208 which is engaged by the adjustment mechanism 66. The cylindrical end portion 208 has an internal thread convolution, specifically, a righthand thread convolution, which is engaged by the adjustment mechanism 66.

Figure 6:
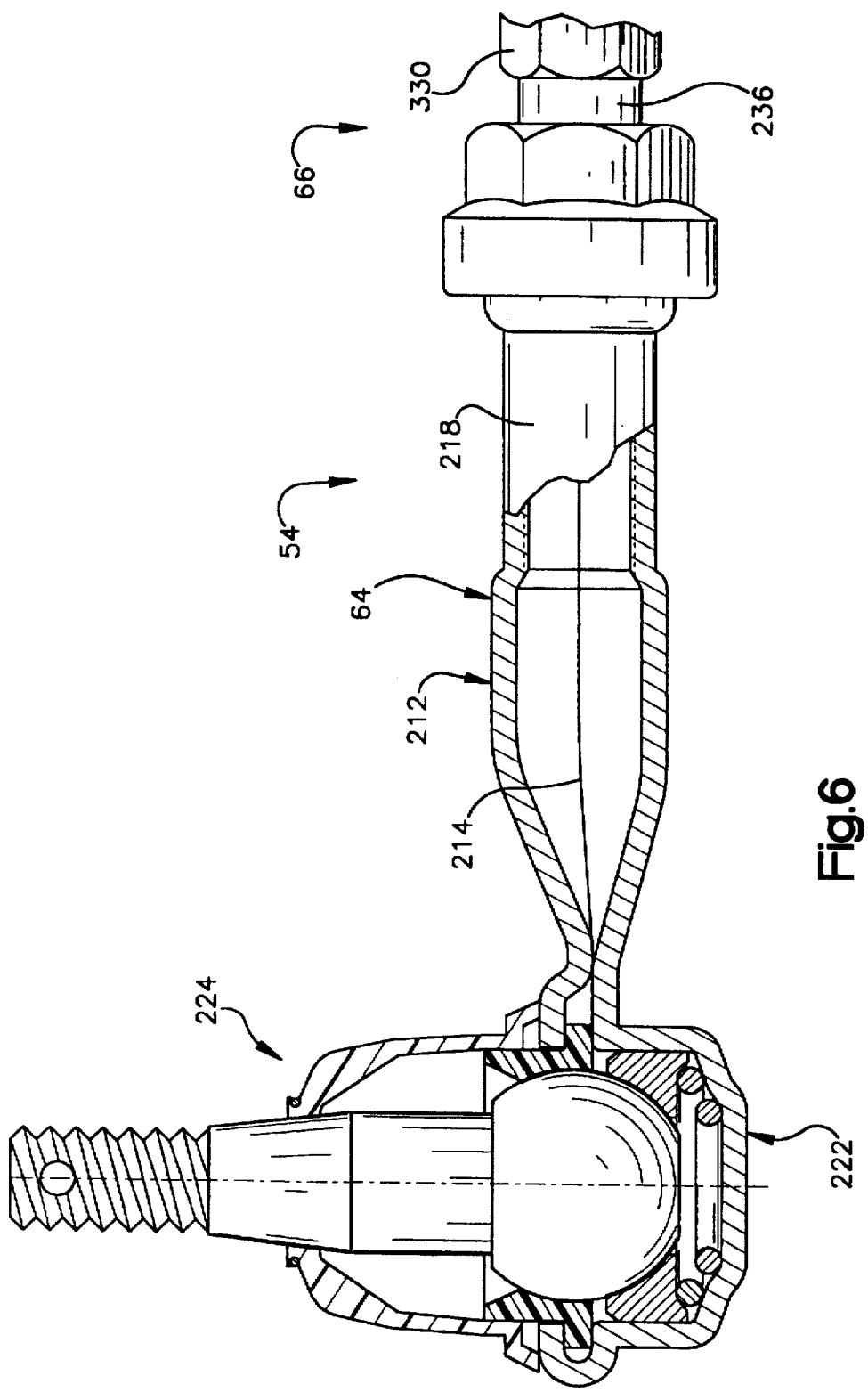
FIG. 6 is a fragmentary sectional view of a portion of FIG. 2 and illustrating the construction of a hollow outer section of the tie rod of FIG. 4.

The outer section 64 (FIGS. 2 and 6) of the first tie rod 54 is formed by a single piece of sheet metal. The outer section 64 of the first tie rod 54 is hollow and has a central portion 212 (FIG. 6) with a generally cylindrical configuration. The outer section 64 has a longitudinally extending seam 214 which extends between opposite ends of the outer section. The seam 214 is formed where edges of the single piece of sheet metal forming the outer section 64 are disposed in abutting engagement.

The outer section 64 has a cylindrical end portion 218 (FIG. 6) which is engaged by the adjustment mechanism 66. The cylindrical end portion 218 of the outer section 64 has an internal thread convolution, specifically, a lefthand internal thread convolution. The outer section 64 has an outer end portion 222 which forms a cylindrical housing of a pivot joint connection 224 having the same construction as the first pivot joint connection 58 (FIG. 4). The pivot joint connection 224 connects the outer section 64 of the first tie rod 54 with the steerable vehicle wheel 22.

The adjustment mechanism 66 (FIGS. 2 and 3) interconnects the inner and outer sections 62 and 64 of the first tie rod 54. The adjustment mechanism 66 includes an adjustment member 230 (FIGS. 4 and 6) having a cylindrical right (as viewed in FIG. 4) end portion 232 with a righthand external thread convolution. The righthand external thread convolution on the adjustment member 230 is disposed in meshing engagement with the righthand internal thread convolution in the cylindrical end portion 208 of the inner section 62 of the first tie rod 54.

Similarly, the adjustment member 230 has a left (as viewed in FIG. 6) end portion 236 with a lefthand external thread convolution. The lefthand external thread convolution on the adjustment member 230 engages a lefthand thread convolution in the cylindrical end portion 218 of the outer section 64 of the first tie rod 54. Upon rotation of the adjustment member 66 about the coincident central axes of the cylindrical end portions 208 and 218 (FIGS. 4 and 6) of the inner and outer sections 62 and 64 of the first tie rod 54, the distance between the inner and outer sections is either increased or decreased to either increase or decrease the length of the first tie rod 54.

The second tie rod 74 (FIGS. 2 and 3) has the same construction as the first tie rod 54. The hollow inner section 82 of the second tie rod 74 is connected with the pivot pin 120 in the second pivot joint connection 78 in the same manner as in which the inner section 62 of the first tie rod 54 is connected with the pivot pin 94 in the first pivot joint connection 58. The hollow outer section 84 of the second tie rod 74 is connected with the steerable vehicle wheel 24 (FIG. 1) by a pivot joint connection 238 in the same manner as in which the outer section 64 of the first tie rod is connected with the steerable vehicle wheel 22 by the pivot joint connection 224.

Linkage Assembly—Second Embodiment

In the embodiment of the linkage assembly 20 illustrated in FIGS. 1–6, the first and second pivot joint connections 58 and 78 are ball and socket type connections. The ball and socket type connections 58 and 78 (FIG. 3) have the ball end portions 96 and 122 of the pivot pins 94 and 120 disposed in housings 90 and 124 formed in the center link 30. In the embodiment of the invention illustrated in FIG. 7, the ball end portions of the pivot pins are disposed in housings formed in the tie rods. Since the embodiment of the invention illustrated in FIG. 7 has the same general construction as the embodiment of the invention illustrated in FIGS. 1–6, similar numerals will be utilized to designate similar components, the suffix letter "a" being associated with the numerals of FIG. 7 to avoid confusion.

A linkage assembly 20a (FIG. 7) includes a hollow center link 30a which is connected with a first hollow tie rod 54a by a first pivot joint connection 58a. A first hollow end portion 32a of the center link 30a is connected with a pitman arm 34a. The center link 30a is formed by a single piece of sheet metal.

The opposite end (not shown) of the center link 30a is connected with a second hollow tie rod having the same construction as the tie rod 54a and corresponding to the tie rod 74 of FIG. 2. The second tie rod is connected with the center link 30a by a second pivot joint connection corresponding to the second pivot joint connection 78 of the FIG. 2 and having the same construction as the pivot joint connection 58a (FIG. 7).

Figure 7:
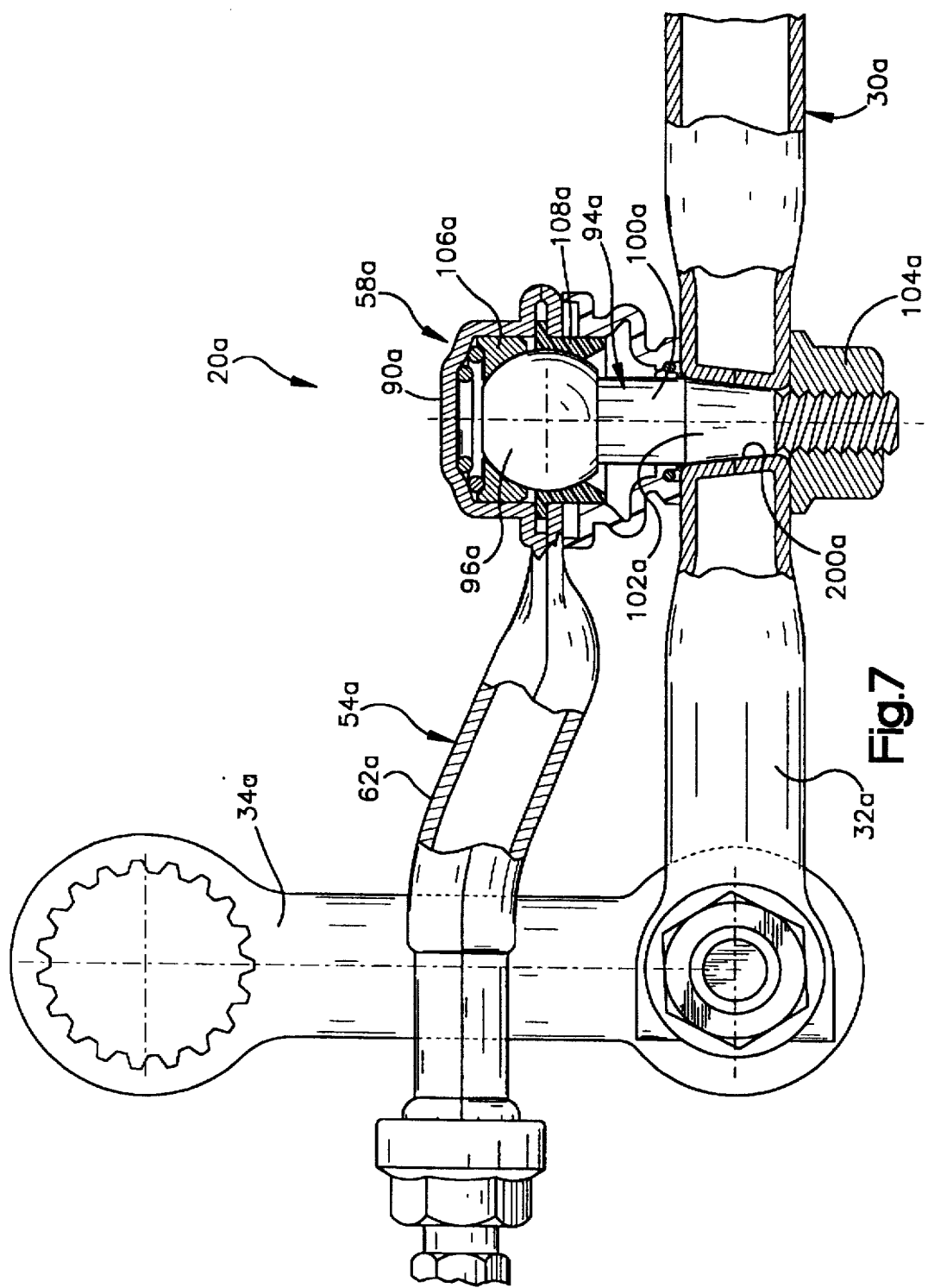
FIG. 7 is a fragmentary sectional view, generally similar to FIG. 4, illustrating the manner in which a hollow inner section of a tie rod is pivotally connected with a hollow center link of a second embodiment of the linkage assembly.

In accordance with a feature of the embodiment of the invention illustrated in FIG. 7, the first pivot joint connection 58a includes a housing 90a which is integrally formed with the inner section 62a of the hollow tie rod 54a. A single piece of sheet metal forms the hollow inner section 62a of the first tie rod 54a. This piece of sheet metal also forms the housing 90a of the pivot joint connection 58a. The first tie rod 54a has a hollow outer section (not shown) with the same construction as the hollow outer section 64 (FIG. 6) of the first tie rod 54.

A pivot pin 94a (FIG. 7) has a ball end portion 96a which engages an inner bearing seat 106a disposed in the housing 90a and an outer bearing seat 108a. The pivot pin 94a has a shank portion 100a with an axially tapering side surface 102a. The shank portion 100a of the pivot pin 94a is integrally formed as one piece with the ball end portion 96a. A nut 104a engages the outer end of the pivot pin 94a.

An axially tapering outer side surface 102a on the shank portion 100a of the pivot pin 94a is received in an axially tapering socket 200a formed by the single piece of sheet metal of the center link 30a. The first pivot joint connection 58a is of the ball and socket type and has the same construction as the first pivot joint connection 58 of FIG. 4. However, in the embodiment of the invention illustrated in FIG. 7, the housing 90a of the first pivot joint connection 58a is formed by part of the single piece of sheet metal forming the hollow inner section 62a of the first tie rod 54a. The axially tapering socket 200a in which the shank portion 100a of the pivot pin 94a is received is formed in the center link 30a.

Although only the first pivot joint connection 58a for the linkage assembly 28a is illustrated in FIG. 7, it should be understood that a second pivot joint connection, corresponding to the second pivot joint connection 78 of FIG. 2, has the same construction as the pivot joint connection 58a of FIG. 7. Thus, the second pivot joint connection for the linkage assembly 58a has a housing which is integrally formed with the hollow inner end portion of the second tie rod and has a socket formed by the center link 30a in which an axially tapering portion of a pivot pin is received. The socket which receives the pin of the second pivot joint connection is disposed in the center link 30a at the same general location where the second connector portion 50 (FIG. 2) is disposed in the center link 30 of the linkage assembly 20 of FIG. 2.

Third Embodiment of the Linkage Assembly

Figure 9:
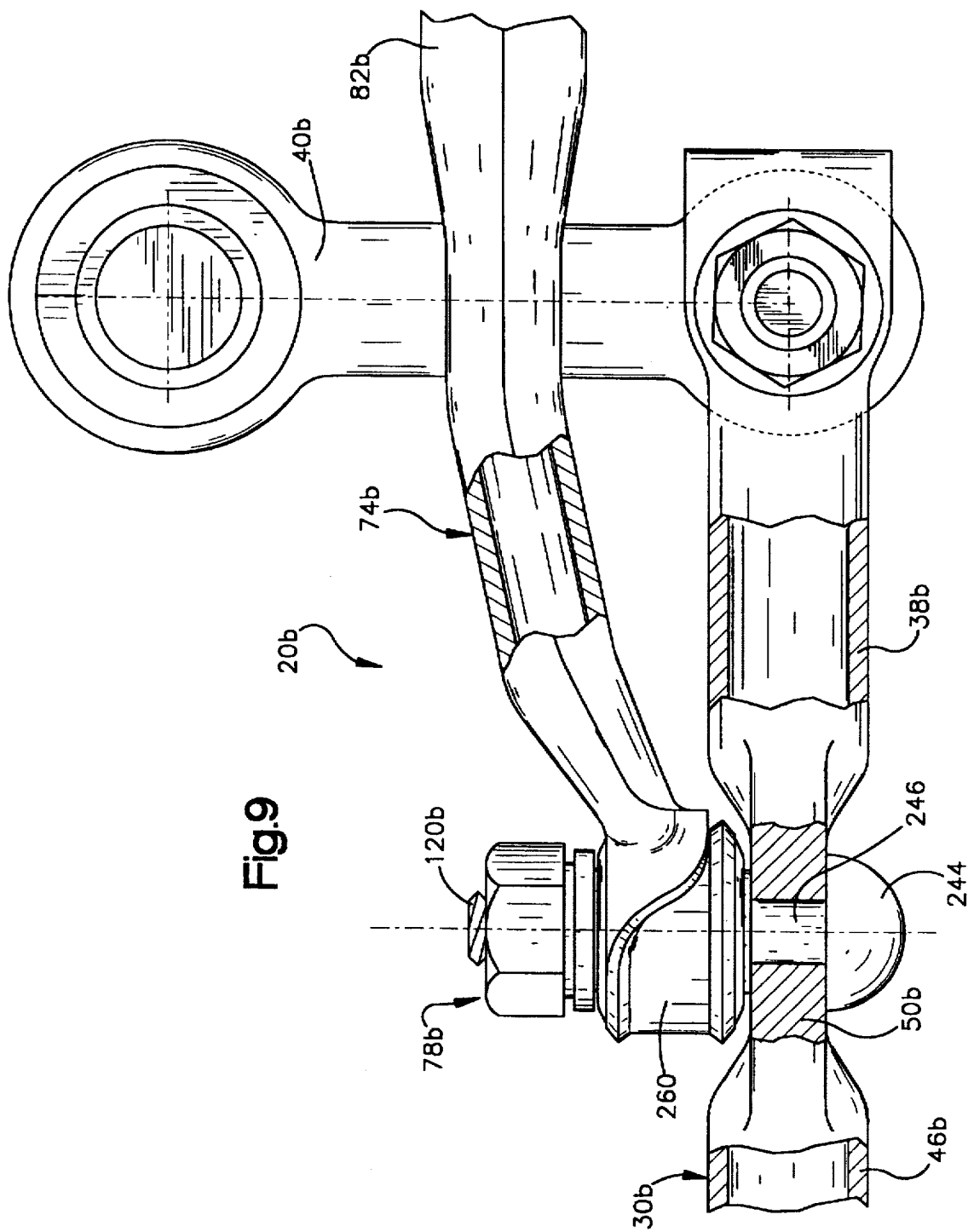
FIG. 9 is an enlarged fragmentary view illustrating the manner in which a hollow inner section of a second tie rod is pivotally connected with the hollow center link of the third embodiment of the linkage assembly.
Figure 10:
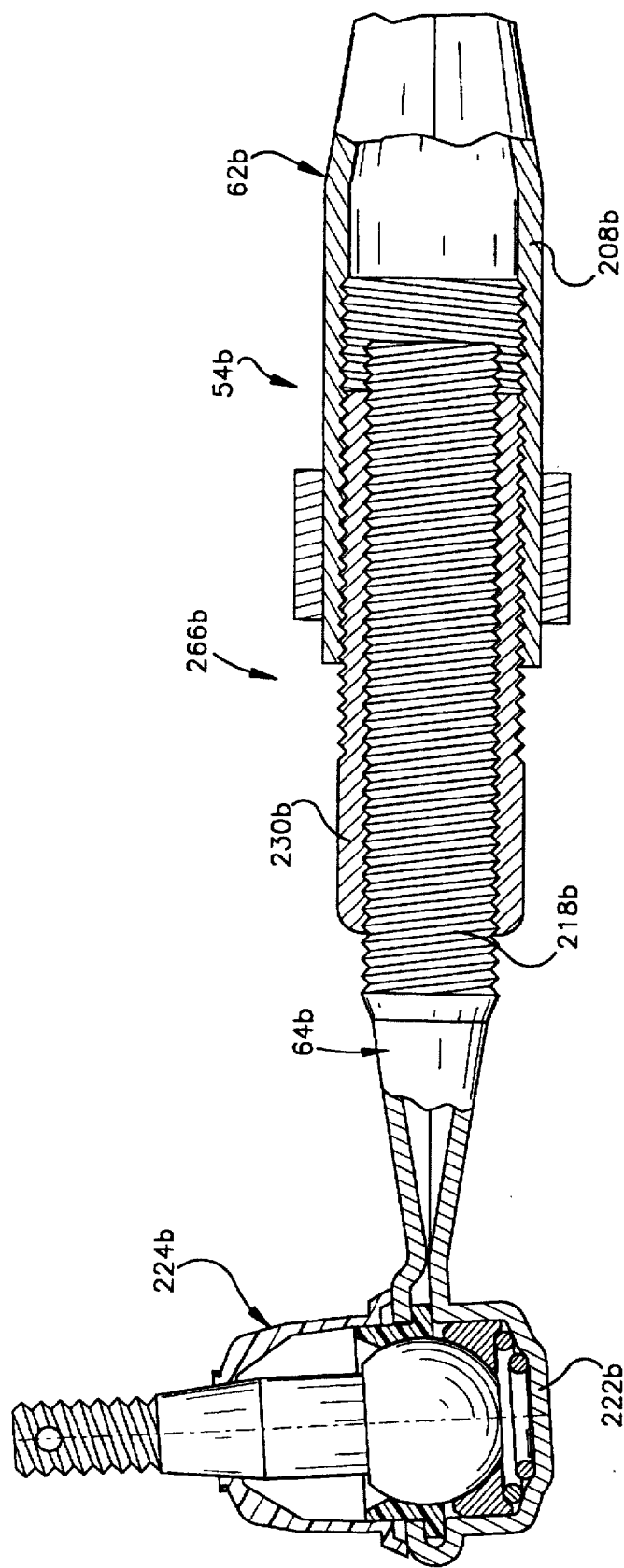
FIG. 10 is a fragmentary sectional view illustrating an adjustment mechanism provided in the tie rod of FIG. 8.

In the embodiments of the linkage assembly illustrated in FIGS. 1–7, the pivot joint connections between the first and second tie rods and the center link are of the ball and socket type. In the embodiment of the invention illustrated in FIGS. 8 and 9, the pivot joint connections are of the pin type. In addition, in the embodiment of the invention illustrated in FIGS. 8 and 9, the inner and outer sections of the tie rods are interconnected by an adjustment mechanism having the construction illustrated in FIG. 10. Since the embodiment of the invention illustrated in FIGS. 8–10 is generally similar to the embodiment of the invention illustrated in FIGS. 1–7, similar numerals will be utilized to designate similar components, the suffix letter "b" being associated with the numerals of FIGS. 8–10 to avoid confusion.

A linkage assembly 20b (FIGS. 8 and 9) includes a hollow center link 30b which is formed by a single piece of sheet metal. The center link 30b has a first hollow end portion 32b (FIG. 8), a hollow central portion 46b (FIGS. 8 and 9) and a hollow second end portion 38b (FIG. 9). The first end portion 32b (FIG. 8) of the center link 30b is connected with a pitman arm 34b. The second end portion 38b (FIG. 9) of the center link 30b is connected with an idler arm 40b.

A hollow inner section 62b (FIG. 8) of the first hollow tie rod 54b is connected with a connector portion 48b of the center link 30b by a first pivot joint connection 58b. Similarly, a hollow inner section 82b (FIG. 9) of the second hollow tie rod 74b is connected with a connector portion 50b of the center link 30b by a second pivot joint connection 78b. The inner sections 62b and 82b of the first and second tie rods 54b and 74b are each formed by a single piece of sheet metal.

Figure 8:
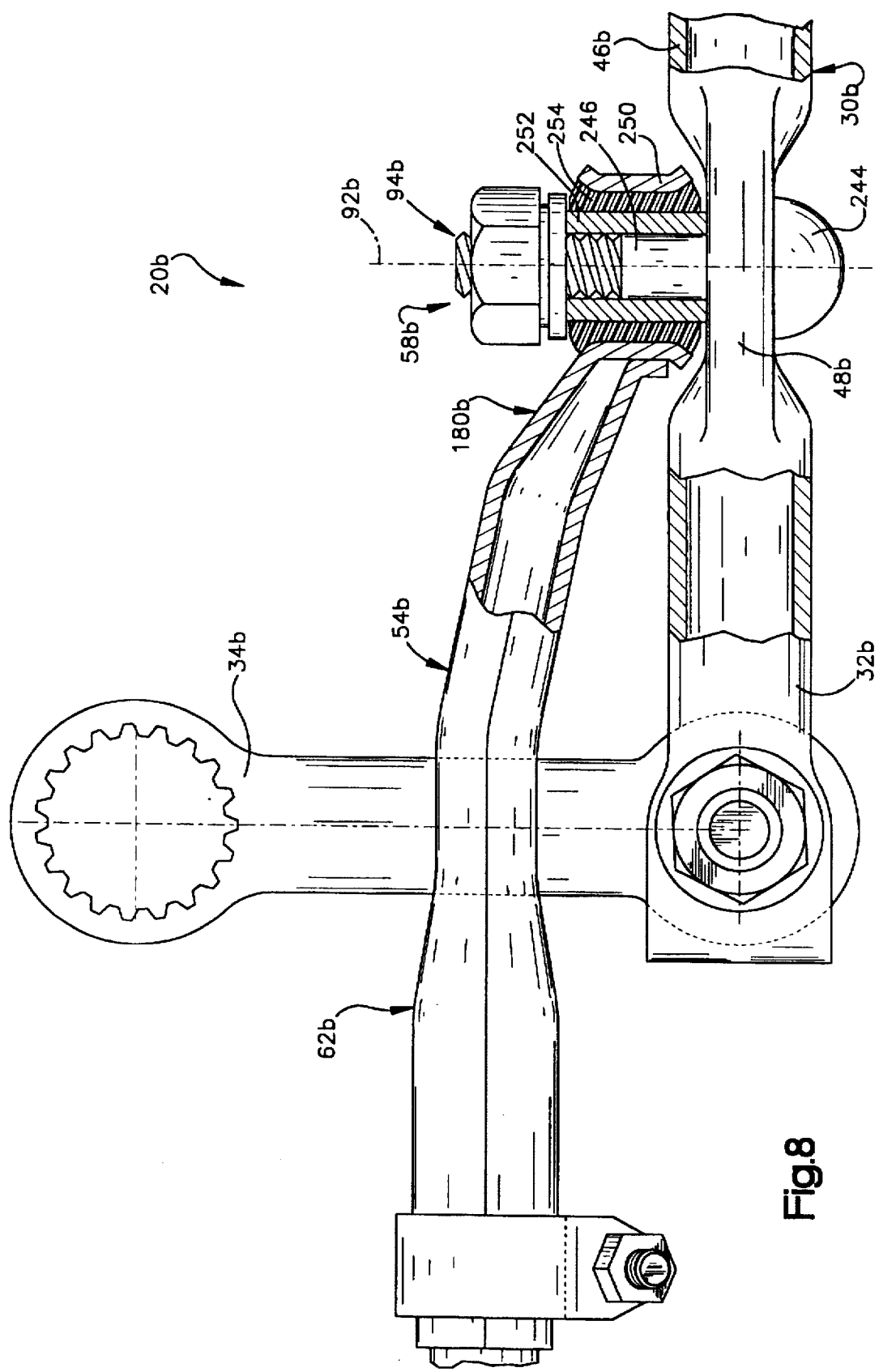
FIG. 8 is an enlarged fragmentary sectional view, generally similar to FIGS. 5 and 7, illustrating the manner in which a hollow inner section of a tie rod is pivotally connected with a hollow center link of a third embodiment of the linkage assembly.

In the embodiment of the invention illustrated in FIG. 8, the first pivot joint connection 58b includes a pivot pin 94b. The pivot pin 94b has a head end portion 244 having a hemispherical configuration and a shank portion 246 having a cylindrical configuration. The shank portion 246 of the pivot pin 94b extends through a circular opening formed in a flattened first connector portion 48b of the center link 30b.

An end portion 180b of the inner section 62b of the first tie rod 54b forms a cylindrical housing 250 which extends around the shank portion 246. The hollow inner section 62b, including the housing 250, is formed by a single piece of sheet metal.

A cylindrical metal sleeve 252 (FIG. 8) extends around the shank portion 246 of the pivot pin 94b. A polymeric bushing 254, having a cylindrical configuration, is disposed between the housing 250 and the sleeve 252. The bushing 254 is resiliently deflectable to accommodate sidewise pivotal movement of the inner section 62b relative to the center link 30b. The sleeve 252, bushing 254, and inner section 62b of the first tie rod 54b pivot together about the central axis 92b of the first pivot joint connection 58b.

The second pivot joint connection 78b (FIG. 9) has the same construction as the first pivot joint connection 58b. The second pivot joint connection 78b includes a pivot pin 120b having a hemispherical head end portion 244 and a cylindrical shank portion 246. The cylindrical shank portion 246 extends through a circular opening in the second connector portion 50b of the center link 30b.

A housing 260 is integrally formed with the hollow inner section 82b of the second tie rod 74b. The hollow inner section 82b of the tie rod 74b, including the housing 260, are formed from a single piece of sheet metal. A sleeve and bushing, corresponding to the sleeve 252 and bushing 254 of FIG. 8, are disposed between the housing 260 and the shank portion 246 of the pivot pin 120b.

In the embodiment of the invention illustrated in FIGS. 8–10, the first tie rod 54b has an adjustment mechanism 266b (FIG. 10) which is operable to vary the length of the first tie rod 54b. The adjustment mechanism 266b includes a tubular cylindrical adjustment member 230b having a righthand external thread convolution. The righthand external thread convolution engages a righthand internal thread convolution formed in a cylindrical end portion 208b of the hollow inner section 62b of the first tie rod 54b. The adjustment member 230b also has a lefthand internal thread convolution. The lefthand internal thread convolution engages a lefthand external thread convolution on an end portion 218b of the hollow outer section 64b of the first tie rod 54b.

The hollow outer section 64b of the first tie rod 54b is formed from a single piece of sheet metal. It should be understood that the second tie rod 74b (FIG. 9) has a hollow outer section of the same construction as the hollow outer section 64b of the first tie rod 54b. The hollow inner section 82b (FIG. 9) and outer section of the second tie rod are interconnected by an adjustment mechanism which has the same construction as the adjustment mechanism 266b.

Upon rotation of the adjustment member 230b (FIG. 10), the opposite hand internal and external thread convolutions on the adjustment member cause the outer section 64b of the first tie rod 54b to move relative to the inner section 62b of the tie rod. Depending upon the direction of rotation of the adjustment member 230b, the length of the first tie rod 54b is either increased or decreased.

A pivot joint connection 224b is disposed on an outer end portion 222b of the outer section 64b of the outer tie rod section 54b. The pivot joint connection 224b is connected with a steerable vehicle wheel.

Linkage Assembly—Fourth Embodiment

Figure 11:
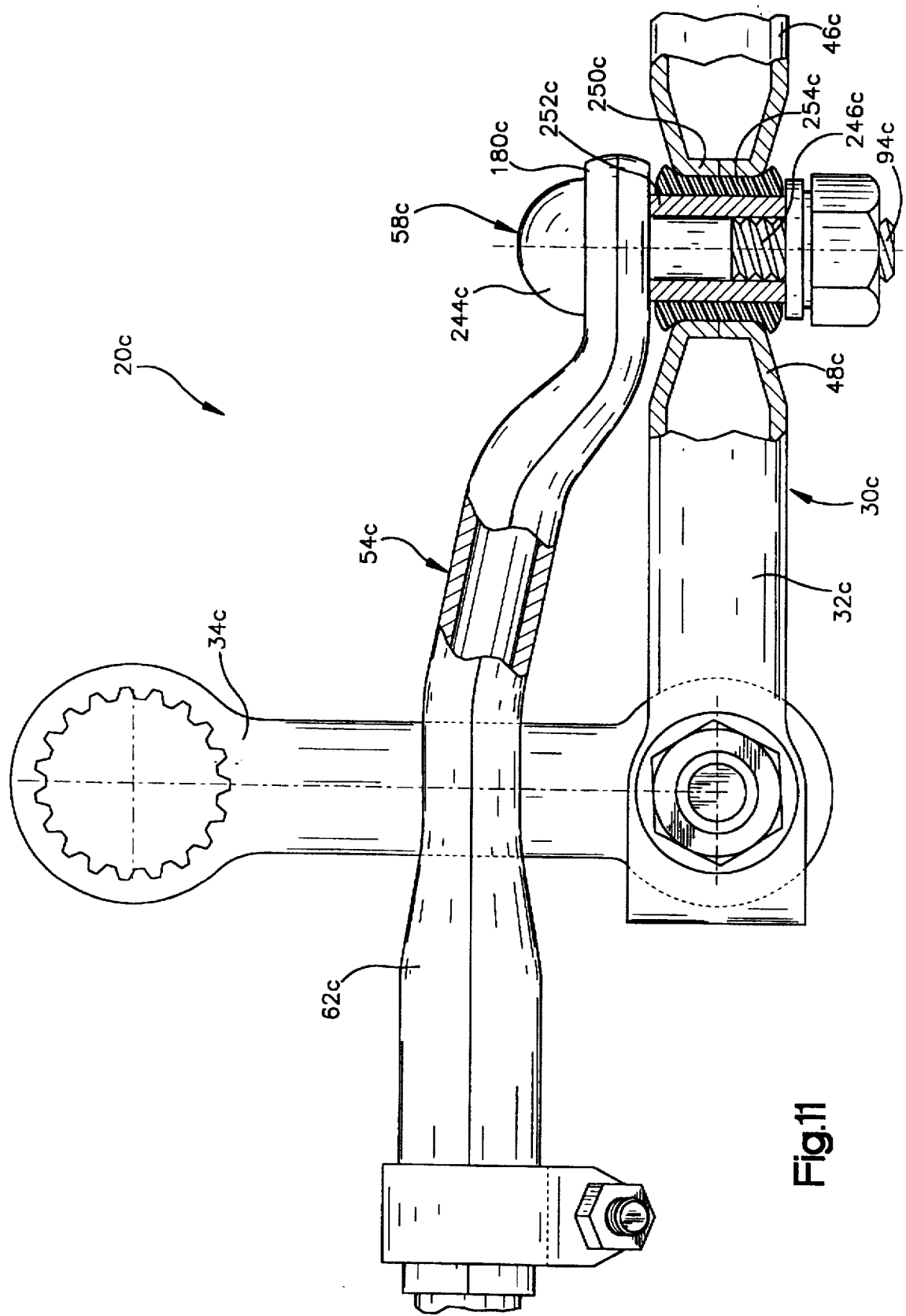
FIG. 11 is an enlarged fragmentary sectional view illustrating the manner in which a hollow inner section of a tie rod is pivotally connected with a hollow center link of a fourth embodiment of the linkage assembly.

In the embodiment of the linkage assembly illustrated in FIGS. 8 and 9, the pivot pins 94b and 120b each have a shank portion 246 which is received in a housing 250 or 260 formed in the inner section 62b of the first tie rod 54b or in the inner section 82b of the second tie rod 74b. In the embodiment of the invention illustrated in FIG. 11, the shank portion of the pivot pins connecting the tie rods with the center link are received in housings formed in the center link. Since the embodiment of the invention illustrated in FIG. 11 is generally similar to the embodiments of the invention illustrated in FIGS. 1–10, similar numerals will be utilized to designate similar components, the suffix letter "c" being associated with the numerals of FIG. 11 to avoid confusion.

A linkage assembly 20c includes a hollow center link 30c having a hollow central portion 46c and a hollow end portion 32c. A connector portion 48c interconnects the first end portion 32c and the central portion 46c of the center link 30c. The first end portion 32c of the center link 30c is pivotally connected with a pitman arm 34c. The connector portion 48c of the center link 30c is pivotally connected with a first hollow tie rod 54c by a first pivot joint connection 58c.

The first tie rod 54c includes a hollow inner section 62c having an end portion 180c with a circular opening through which a pivot pin 94c extends. The pivot pin 94c extends into a housing 250c formed by the connector portion 48c of the center link 30c. The pivot pin 94c has a hemispherical head end 244c and a cylindrical shank portion 246c which extends axially outwardly from the head end portion 244c.

The shank portion 246c extends through a circular opening in the end portion 180c of the inner section 62c of the tie rod 54c. In addition, the shank portion 246c extends through the housing 250c formed in the center link 30c. A cylindrical sleeve 252c extends around the shank portion 246c of the pivot pin 94c. A bushing 254c formed of a resilient polymeric material, is disposed between the sleeve 252c and the housing 250c.

Although only the first pivot joint connection 58c between the first hollow tie rod 54c and the center link 30c is shown in FIG. 11, a second hollow tie rod is connected with the center link by a second pivot joint connection. Thus, a second pivot joint connection having the same construction as the pivot joint connection 58c and corresponding to the second pivot joint connections 78 and 78b connects the hollow center link 30c with a second hollow tie rod.

From the above description of the invention, those skilled in the art will perceive improvements, changes and modifications. Such improvements, changes and modifications within the skill of the art are intended to be covered by the appended claims.

Having described the invention, the following is claimed:

1. A linkage assembly for use in turning steerable vehicle wheels, said linkage assembly comprising:

a center link formed of sheet metal, said center link having a hollow central section, a hollow first end section, a first connector section interconnecting said central section and said first end section, a hollow second end section, and a second connector section interconnecting said central section and said second end section, said first end section having an outer end portion to be connected with a pitman arm, said second end section having an outer end portion to be connected with an idler arm;

a first tie rod connected with said first connector section of said center link, said first tie rod including a hollow inner section formed of sheet metal and having an end portion connected with said first connector section of said center link, a hollow outer section formed of sheet metal and having an end portion to be connected with a first steerable vehicle wheel, and a first adjustment mechanism interconnecting said inner and outer sections of said first tie rod to enable the length of said first tie rod to be varied;

a second tie rod connected with said second connector section of said center link, said second tie rod including a hollow inner section formed of sheet metal and having an end portion connected with said second connector section of said center link, a hollow outer section formed of sheet metal and having and end portion to be connected with a second steerable vehicle wheel, and a second adjustment mechanism interconnecting said inner and outer sections of said second tie rod to enable the length of said second tie rod to be varied; and a first pivot joint interconnecting said center link and said first tie rod at said first connector section, said first pivot joint including a first pivot pin having a first portion which is at least partially enclosed by sheet metal of said center link and a second portion which is at least partially enclosed by sheet metal of said inner section of said first tie rod, and a second pivot joint interconnecting said center link and said second tie rod at said second connector section, said second pivot pin having a first portion which is at least partially enclosed by sheet metal of said center link and a second portion which is at least partially enclosed by sheet metal of said inner section of said second tie rod;

said first pivot pin having a first head end portion and a first shank portion which extends axially outward from said first head end portion, said first portion of said first pivot pin being a portion of said first shank portion which is disposed adjacent to said first head end portion, said sheet metal of said center link which at least partially encloses said first portion of said first pivot pin being configured to form a surface which is engaged by said first head end portion.

2. A linkage assembly as set forth in claim 1 wherein said second pivot pin has a second head end portion and a second shank portion which extends axially outward from said second head end portion, said first portion of said second pivot pin being a portion of said second shank portion which is disposed adjacent to said first head end portion, said sheet metal of said center link which at least partially encloses said first portion of said second pivot pin being configured to form a surface which is engaged by said second head end portion.

3. A linkage assembly for use in turning steerable vehicle wheels, said linkage assembly comprising:

a center link formed of sheet metal, said center link having a hollow central section, a hollow first end section, a first connector section interconnecting said central section and said first end section, a hollow second end section, and a second connector section interconnecting said central section and said second end section, said first end section having an outer end portion to be connected with a pitman arm, said second end section having an outer end portion to be connected with an idler arm;

a first tie rod connected with said first connector section of said center link, said first tie rod including a hollow inner section formed of sheet metal and having an end portion connected with said first connector section of said center link, a hollow outer section formed of sheet metal and having an end portion to be connected with a first steerable vehicle wheel, and a first adjustment mechanism interconnecting said inner and outer sections of said first tie rod to enable the length of said first tie rod to be varied;

a second tie rod connected with said second connector section of said center link, said second tie rod including a hollow inner section formed of sheet metal and having an end portion connected with said second connector section of said center link, a hollow outer section formed of sheet metal and having and end portion to be connected with a second steerable vehicle wheel, and a second adjustment mechanism interconnecting said inner and outer sections of said second tie rod to enable the length of said second tie rod to be varied; and a first pivot joint interconnecting said center link and said first tie rod at said first connector section, said first pivot joint including a first pivot pin having a first portion which is at least partially enclosed by sheet metal of said center link and a second portion which is at least partially enclosed by sheet metal of said inner section of said first tie rod, and a second pivot joint interconnecting said center link and said second tie rod at said second connector section, said second pivot pin having a first portion which is at least partially enclosed by sheet metal of said center link and a second portion which is at least partially enclosed by sheet metal of said inner section of said second tie rod;

said first pivot pin having a first head end portion and a first shank portion which extends axially outward from said first head end portion, said second portion of said first pivot pin being a portion of said first shank portion which is disposed adjacent to said first head end portion, said sheet metal of said end portion of said inner section of said first tie rod which at least partially encloses said second portion of said first pivot pin being configured to form a surface which is engaged by said first head end portion.

4. A linkage assembly as set forth in claim 3 wherein said second pivot pin has a second head end portion and a second shank portion which extends axially outward from said second head end portion, said second portion of said second pivot pin being a portion of said second shank portion which is disposed adjacent to said second head end portion, said sheet metal of said end portion of said inner section of said first tie rod which at least partially encloses said second portion of said second pivot pin being configured to form a surface which is engaged by said second head end portion.

5. A linkage assembly for use in turning steerable vehicle wheels, said linkage assembly comprising:

a center link formed of a single piece of sheet metal, said center link having a first outer end portion to be connected with a pitman arm and a second outer end portion to be connected with an idler arm;

a first tie rod connected with said center link, said first tie rod including an inner section formed of a single piece of sheet metal and connected with said center link, an outer section formed of a single piece of sheet metal and having an end portion to be connected with a first steerable vehicle wheel, and a first adjustment mechanism interconnecting said inner and outer sections of said first tie rod to enable the length of said first tie rod to be varied;

a second tie rod connected with said center link, said second tie rod including an inner section formed of a single piece of sheet metal and connected with said center link, an outer section formed of a single piece of sheet metal and having an end portion to be connected with a second steerable vehicle wheel, and a second adjustment mechanism interconnecting said inner and outer sections of said second tie rod to enable the length of said second tie rod to be varied;

a first pivot joint interconnecting said center link and said first tie rod, said first pivot joint including a first pivot pin having a first portion which is at least partially enclosed by sheet metal of said center link and a second portion which is at least partially enclosed by sheet metal of said inner section of said first tie rod; and a second pivot joint interconnecting said center link and said second tie rod, said second pivot joint including a second pivot pin having a first portion which is at least partially enclosed by sheet metal of said center link and a second portion which is at least partially enclosed by sheet metal of said inner section of said second tie rod;

said first pivot pin having a first head end portion and a first shank portion which extends axially outward from said first head end portion, said first portion of said first pivot pin being a portion of said first shank portion which is disposed adjacent to said first head end portion, said sheet metal of said center link which at least partially encloses said first portion of said first pivot pin being configured to form a surface which is engaged by said first head end portion.

6. A linkage assembly as set forth in claim 5 wherein said second pivot pin has a second head end portion and a second shank portion which extends axially outward from said second head end portion, said first portion of said second pivot pin being a portion of said second shank portion which is disposed adjacent to said first head end portion, said sheet metal of said center link which at least partially encloses said first portion of said second pivot pin being configured to form a surface which is engaged by said second head end portion.

7. A linkage assembly for use in turning steerable vehicle wheels, said linkage assembly comprising:

a center link formed of a single piece of sheet metal, said center link having a first outer end portion to be connected with a pitman arm and a second outer end portion to be connected with an idler arm;

a first tie rod connected with said center link, said first tie rod including an inner section formed of a single piece of sheet metal and connected with said center link, an outer section formed of a single piece of sheet metal and having an end portion to be connected with a first steerable vehicle wheel, and a first adjustment mechanism interconnecting said inner and outer sections of said first tie rod to enable the length of said first tie rod to be varied;

a second tie rod connected with said center link, said second tie rod including an inner section formed of a single piece of sheet metal and connected with said center link, an outer section formed of a single piece of sheet metal and having an end portion to be connected with a second steerable vehicle wheel, and a second adjustment mechanism interconnecting said inner and outer sections of said second tie rod to enable the length of said second tie rod to be varied;

a first pivot joint interconnecting said center link and said first tie rod, said first pivot joint including a first pivot pin having a first portion which is at least partially enclosed by sheet metal of said center link and a second portion which is at least partially enclosed by sheet metal of said inner section of said first tie rod; and a second pivot joint interconnecting said center link and said second tie rod, said second pivot joint including a second pivot pin having a first portion which is at least partially enclosed by sheet metal of said center link and a second portion which is at least partially enclosed by sheet metal of said inner section of said second tie rod;

said first pivot pin having a first head end portion and a first shank portion which extends axially outward from said first head end portion, said second portion of said first pivot pin being a portion of said first shank portion which is disposed adjacent to said first head end portion, said sheet metal of said inner section of said first tie rod which at least partially encloses said second portion of said first pivot pin being configured to form a surface which is engaged by said first head end portion.

8. A linkage assembly as set forth in claim 7 wherein said second pivot pin has a second head end portion and a second shank portion which extends axially outward from said second head end portion, said second portion of said second pivot pin being a portion of said second shank portion which is disposed adjacent to said second head end portion, said sheet metal of said inner section of said first tie rod which at least partially encloses said second portion of said second pivot pin being configured to form a surface which is engaged by said second head end portion.

* * * * *